United States Patent Office 2,841,450
Patented July 1, 1958

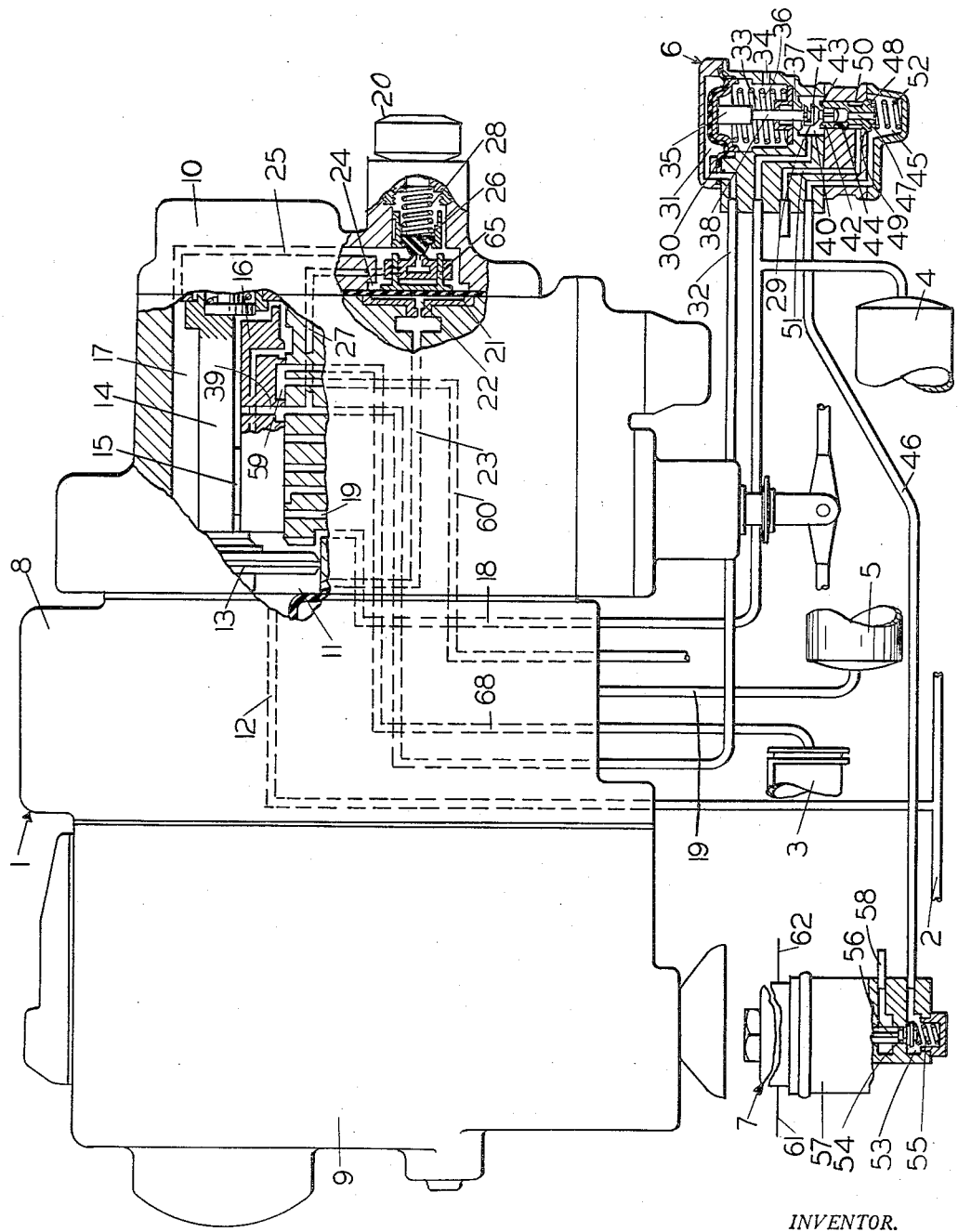

2,841,450

ELECTRO-PNEUMATIC BRAKE APPARATUS

George L. Cotter, Pittsburgh, Pa., assignor to Westinghouse Air Brake Company, Wilmerding, Pa., a corporation of Pennsylvania Application March 26, 1954, Serial No. 419,017

5 Claims. (Cl. 303—70)

This invention relates to fluid pressure brake equipment for controlling the application and release of the brakes on railway vehicles such as an equipment of the type disclosed in Patent No. 2,031,213, issued to Clyde C. Farmer on February 18, 1936, and more particularly to an electro-pneumatic release insuring mechanism for accelerating the release of the brakes on the cars in a train.

The principal object of the invention is to provide an improved release facilitating means which may be incorporated in a freight brake equipment of the above type without necessitating any changes in the aforesaid equipment.

Another object of the invention is to provide an improved electrically propagated release insuring means for the above type of brake equipment which will insure a release of the brakes initiated from the locomotive after a service application regardless of the drop in brake pipe pressure from the front to the rear of the train.

Other objects and advantages will appear from the following detailed description of the invention taken in connection with the accompanying drawing, which is a diagrammatic view, partly in section and partly in outline, of a fluid pressure brake equipment embodying the invention shown in its normal release position.

As shown in the drawing, the fluid pressure brake equipment may be of the type disclosed in the aforementioned Farmer patent, which equipment comprises a brake controlling valve device 1, a brake pipe 2, a brake cylinder device 3, an auxiliary reservoir 4, an emergency reservoir 5, a release insuring cut-off valve device 6 and a magnet valve device 7.

The various parts and devices of the equipment are of substantially the same construction, and function in substantially the same manner in controlling the application and release of the brakes, as the corresponding parts and devices of the equipment disclosed in the aforementioned Farmer patent. Therefore, for the purpose of simplifying, a detailed description of the various functions and details of construction of the equipment will be omitted.

The brake controlling valve device 1 comprises a pipe bracket 8, on one face of which is mounted an emergency portion 9 and on the opposite face of which is mounted a service portion 10. The service portion comprises a casing having a chamber 11 connected through a passage and pipe 12 to brake pipe 2 and containing a piston 13 provided with a stem 14 adapted to operate an auxiliary slide valve 15 and main slide valve 16 contained in a valve chamber 17 which is connected through a passage and pipe 18 to the auxiliary reservoir 4.

The service portion 10 has incorporated therein a release insuring valve device 20, provided for the purpose of venting fluid under pressure from the auxiliary reservoir 4 when, in effecting a release of the brakes, the brake pipe pressure exceeds the auxiliary reservoir pressure by a certain degree, so as to facilitate movement of the service piston 13 to release position. Briefly described, this device comprises a flexible diaphragm 21 having a chamber 22 open by way of a passage 23 to piston chamber 11 and consequently to the brake pipe 2, and having at the opposite side a chamber 24 open through a passage 25 to the valve chamber 17 and consequently to the auxiliary reservoir 4 by way of the additional passage 18. Contained in the chamber 24 is a valve 26 which is operative to control communication from said chamber to a vent passage 27 leading to the seat of the main slide valve 16 of the service portion 10, the valve 26 normally being held closed by a spring 28. The flexible diaphragm 21 is subjected, as will be understood, to the opposing pressure of the brake pipe and auxiliary reservoir and operable to control the operation of the valve 26.

The release insuring cut-off valve device 6 comprises a casing containing a diaphragm 30 clamped about its periphery between two sections of said casing and defining therewith at one side a control chamber 31 open to pipe 32 which leads through passage 27 to the seat for slide valve 16, and at the other side a spring chamber 33 which is open to atmosphere through a vent port 34. Contained in chamber 33 is a diaphragm follower 35 which is held in operative contact with the diaphragm 21 by a spring 36 interposed between said follower and a partition wall 37 of chamber 33 and encircling a stem 38 formed integral with said follower.

A chamber 40, open to passage and pipe 18, is formed in the casing at the side of partition wall 37 opposite to chamber 33 and contains a valve 41 which is linked by means of a forked connection 29 to the lower end of follower stem 38, as viewed in the drawing, which is slidably mounted in a suitable bore in said wall. The valve 41 is adapted to make seating engagement with a valve seat 43 formed on the upper end of a valve member 42 which is slidably mounted in a bore 44 formed in the casing and extending from chamber 40 to a chamber 45 which is constantly open by way of a passage and pipe 46 to the magnet valve device 7.

The valve member 42 is provided with a through bore 47 encircled at its upper end by the valve seat 43 and at its lower end by a valve 48 which valve is arranged for cooperation with a valve seat 49, formed in the casing at the lower end of bore 44, to control communication between chamber 45 and a chamber 40, defined by the wall of said bore and a reduced portion of said valve member and open to atmosphere through a passage 51. A spring 52 is operatively mounted in chamber 45 to constantly urge the valve member 42 upwardly to a position in which communication between chambers 40 and 45 is open and communication between chamber 45 and atmosphere is closed, as shown in the drawing.

The magnet valve device 7 comprises a casing structure having a valve chamber 53 containing an exhaust valve 54 which is urged toward a normal seated position by a bias spring 55 and is operable by an armature stem 56 to an unseated position upon energization of a magnet 57, in which position chamber 53, which is constantly connected to pipe 46, is connected to atmosphere by way of passage 58.

*Operation*

In operation, to initially charge the equipment fluid under pressure may be supplied to the brake pipe 2 in the usual manner, in response to which the brake controlling valve device 1 will assume its release position, shown in the drawing, in which fluid under pressure supplied from brake pipe 2 through passage 12 to the piston chamber 11 will flow by way of a restricted passage (not shown) to valve chamber 17, whence it will flow to the auxiliary reservoir 4 by way of passage and pipe 18 and to the emergency reservoir 5 by way of passage and pipe 19 to charge the same in the manner described in detail in the aforementioned patent. At the same time, the brake cylinder device 3 will be vented to atmosphere by the usual route via passage 68, cavity 59 in slide valve 16, and passage 60. Fluid under pressure supplied to chamber 17 will flow through port 39 in slide valve 16 and passage and pipe 32 to chamber 31 in the cut-off valve device 6. When the pressure of fluid thus supplied to chamber 31 becomes sufficient to overcome the opposing force of spring 36, diaphragm 30 will deflect downwardly, moving valve 41 to its seated position and valve 48 to its unseated position. At this point it should be noted that, with the service portion 10 in release position, the release insuring cut-off valve device 6 completely isolates the magnet valve device 7 so that any operation of the magnet valve device will not influence the operation of the rest of the brake apparatus.

In effecting an application of the brakes, fluid pressure in brake pipe 2 and connected piston chamber 11 will be reduced by operation of the usual locomotive brake valve device (not shown) in the usual manner. When the pressure in piston chamber 11 is reduced to slightly less than pressure of fluid in valve chamber 17, the piston 13 will move outwardly toward service position, cutting off charging communication between chambers 11 and 17, and shifting first, the auxiliary slide valve 15, and then, the main slide valve 16 in the same direction to service position in which an application of the vehicle brakes will be effected in the manner described in the aforesaid patent.

With the main slide valve 16 in service position port 39 in said slide valve will be lapped off, fluid under pressure will flow from auxiliary reservoir 4 through pipe 18, chamber 17 and a passage 68 to brake cylinder device 3 in the usual manner, and a cavity 59 will connect passages 27 and 32, and thereby chamber 31, to atmosphere by way of a passage 60. Upon venting of fluid under pressure from chamber 31 being thus effected, spring 36 will be permitted to actuate follower 35 and diaphragm 39 upwardly and, through the medium of the follower stem 38, to unseat valve 41 and spring 52 to seat valve 48. With valves 41 and 48 thus disposed, chamber 53 in the magnet valve device 7 will be cut off from atmosphere by valve 48 and be charged with fluid under pressure from valve chamber 17 by way of passage 18, chamber 40, bore 47 in valve member 42, chamber 45 and connected passage and pipe 46.

In effecting a release of the brakes the brake valve device (not shown) will be moved to release position to supply fluid under pressure to the brake pipe 2 in the usual manner. At the same time magnet 57 of the magnet valve device 7 will become energized by means of the conductors 61 and 62 by transmitter means not shown or described herein since it does not constitute any part of this invention, and is not necessary to a clear understanding of the invention. Upon energization of magnet 57, armature stem 56 will be actuated downwardly, unseating valve 54. With valve 54 unseated fluid under pressure in chamber 53, in chamber 17 connected thereto by the route described above, and in chamber 24 in the release insuring valve device 20 connected to chamber 17 through passage 25 will be vented to atmosphere through passage 58.

Now, it will be noted that, in effecting a service application of the brakes, fluid under pressure in the auxiliary reservoir 4 flows to the brake cylinder device 3 until auxiliary reservoir pressure in chamber 17 is reduced to slightly below brake pipe pressure, after which the two opposing pressures acting on piston 13 become substantially equal. Thus, in releasing the brakes, when auxiliary reservoir pressure in chamber 24 at the right-hand side of diaphragm 21 in the release insuring valve device 20, as viewed in the drawing, is reduced below brake pipe pressure in chamber 22 at the opposite side of said diaphragm by about one and one-half pounds, said diaphragm will be flexed to the right and through the medium of a follower 65 will unseat the release insuring valve 26. Fluid under pressure in chamber 24 will then flow through passage 27, cavity 59 and passage 60, to the atmosphere.

Thus, venting of fluid from the valve chamber 17 by way of magnet valve device 7 and also release insuring valve device 20 will continue until the pressure in said chamber is reduced sufficiently below brake pipe pressure acting on the opposite side of piston 13 to cause said piston to move to the right and shift the slide valves 15 and 16 to release position, in which communication between passages 27, 32 and atmospheric passage 60 is cut off by the main slide valve to thereby terminate venting operation of valve device 20 and valve chamber 17 is again connected to chamber 31 in the release insuring cut-off valve device 6 to prevent venting of auxiliary reservoir pressure to atmosphere by operation of the magnet valve device 7.

It should here be understood that in the event of a retaining valve of the usual type (not shown) being attached to atmospheric passage 60 and set to retain a certain pressure such as twenty pounds in said passage, such pressure in passage 32 will not be sufficient to hold valve device 6 in its cut-off position when passage 32 is connected to passage 60 in application position of the service portion 10.

With the parts of the brake controlling valve device 8 in release position, brake cylinder device 3 is connected to atmosphere by way of pipe and passage 68, cavity 59 and passage 60 and fluid will flow from the brake cylinder through this communication to atmosphere, thereby releasing the brakes. At the same time fluid under pressure will flow from piston chamber 11 to valve chamber 17 and thence to auxiliary reservoir 4 and emergency reservoir 5 to charge same in the same manner as previously described.

*Summary*

From the foregoing, it will be seen that I have provided with this invention a novel means adapted to co-operate with the usual release insuring valve device of the usual fluid pressure brake equipment, without any major alterations thereto, to initiate a local release of each car brake, without waiting for a local increase in brake pipe pressure propagated by a supply of fluid under pressure from the locomotive brake valve device, and thereby effect a more prompt release of all the brakes throughout a train.

Having now described my invention, what I claim as new and desire to secure by Letters Patent, is:

1. In a fluid pressure brake apparatus, in combination, a brake pipe, an auxiliary reservoir, a brake cylinder device, a brake controlling valve device having a valve chamber always open to auxiliary reservoir and operable upon a reduction in brake pipe pressure to an application position in which fluid under pressure is supplied from said valve chamber to said brake cylinder device and operable upon a preponderance of brake pipe pressure over auxiliary reservoir pressure to a release position in which said brake cyinder device is vented to atmosphere and said brake pipe is connected to said valve chamber, release insuring valve means operative when said brake controlling valve device is in said application position to vent said valve chamber to atmosphere in response to a preponderance of brake pipe pressure over auxiliary reservoir pressure, electro-pneumatic means electrically operative to establish communication for venting fluid under pressure from said valve chamber to directly induce movement of said valve device to release position and to cause said venting operation of said release insuring valve means to thereby indirectly induce movement of said valve device to release position, and cut-off valve means interposed in said communication between said electro-pneumatic means and said valve chamber operative in response to pressure of fluid supplied from said valve chamber when said valve device is in said release position to prevent venting of fluid through said communication.

2. In a fluid pressure brake apparatus, in combination, a brake pipe, an auxiliary reservoir, a brake cylinder device, a brake controlling valve device having a valve chamber always open to auxiliary reservoir and operable upon a reduction in brake pipe pressure to an application position in which fluid under pressure is supplied from said valve chamber to said brake cylinder device and operable upon a preponderance of brake pipe pressure over auxiliary reservoir pressure to a release position in which said brake cylinder device is vented to atmosphere and said brake pipe is connected to said valve chamber, release insuring valve means operative when said brake controlling valve device is in application position to open said valve chamber to atmosphere in response to a preponderance of brake pipe pressure over auxiliary reservoir pressure, electro-pneumatic means electrically operative to establish communication for venting fluid under pressure from said valve chamber to directly induce movement of said valve device to release position and indirectly induce said movement by causing said venting operation of said release insuring valve means, cut-off valve means interposed in said communication between said electro-pneumatic means and said valve chamber operative in response to pressure of fluid in a control chamber to prevent venting of fluid by said electro-pneumatic means through said communication, and valve means included in said brake controlling valve operative when said valve device is in release position to connect said valve chamber to said control chamber and when said valve device is in application position to connect said control chamber and fluid under pressure vented by said release insuring valve means from said valve chamber to atmosphere.

3. In a fluid pressure brake apparatus, a brake pipe, an auxiliary reservoir, a brake cylinder device, a brake controlling valve device having a valve chamber always open to auxiliary reservoir and operable upon a reduction in brake pipe pressure to an application position in which fluid under pressure is supplied from said valve chamber to said brake cylinder device and upon a preponderance in brake pipe pressure after a reduction in brake pipe pressure to a release position in which said brake cylinder device is vented to atmosphere and said brake pipe is connected to said valve chamber, a control conduit adapted to be connected by said brake controlling valve device to said valve chamber in said release position and to atmosphere in said application position, release insuring valve means comprising a movable abutment subject to opposing pressures of fluid in said brake pipe and said valve chamber operable upon a preponderance in brake pipe pressure to connect said valve chamber to said control conduit, electro-pneumatic means operative upon being energized to establish a communication for venting fluid under pressure from said valve chamber, and cut-off valve means interposed in said communication between said electro-pneumatic means and said valve chamber operative in response to pressure of fluid in said control conduit to cut off said communication between said valve chamber and said electro-pneumatic means.

4. In a fluid pressure brake apparatus, in combination, a brake pipe, an auxiliary reservoir, a brake cylinder device, a brake controlling valve device having a valve chamber always open to auxiliary reservoir and operable upon a reduction in brake pipe pressure to an application position in which fluid under pressure is supplied from said valve chamber to said brake cylinder device and operable in response to a preponderance of brake pipe pressure over auxiliary reservoir pressure to a release position in which said brake cylinder device is vented to atmosphere and said brake pipe is connected to said valve chamber, a control conduit, valve means incorporated in said brake controlling valve device operative when said valve device is in release position to connect said valve chamber to said control conduit and in said application position to connect said conduit to atmosphere, release insuring valve means comprising a movable abutment subject to opposing pressures of fluid in said brake pipe and said valve chamber and operative in response to a preponderance of brake pipe pressure to connect said valve chamber to said control conduit, electro-pneumatic means operable electrically to vent fluid under pressure from said valve chamber to render said release insuring valve means effective, and cut-off valve means interposed between said electro-pneumatic means and said valve chamber operative in response to pressure of fluid in said control conduit to prevent the venting of fluid from said valve chamber by said electro-pneumatic means.

5. In a fluid pressure brake apparatus, in combination, a brake pipe, an auxiliary reservoir, a brake cylinder device, a brake controlling valve device having a valve chamber always open to auxiliary reservoir and operable upon a reduction in brake pipe pressure to an application position in which fluid under pressure is supplied from said valve chamber to said brake cylinder device and operable upon a preponderance of brake pipe pressure over auxiliary reservoir pressure to a release position in which said brake cylinder device is vented to atmosphere, a control conduit, valve means incorporated in said brake controlling valve device operative when said valve device is in said release position to connect said valve chamber to said control conduit and in said application position to connect said conduit to atmosphere, electro-pneumatic means electrically operable to establish communication through which fluid under pressure may be vented from said valve chamber to atmosphere, and cut-off valve means interposed in said communication between said electro-pneumatic means and said valve chamber operative in response to pressure of fluid in said control conduit to close said communication.

References Cited in the file of this patent

UNITED STATES PATENTS

| | | |
|---|---|---|
| 1,622,430 | Farmer et al. | Mar. 29, 1927 |
| 1,703,892 | McCune | Mar. 5, 1929 |
| 1,712,535 | Warren | May 14, 1929 |
| 1,927,932 | Farmer | Sept. 26, 1933 |
| 2,045,185 | Hewitt | June 23, 1936 |